United States Patent
Takeuchi et al.

(10) Patent No.: US 7,637,331 B2
(45) Date of Patent: Dec. 29, 2009

(54) STEERING DEVICE FOR VEHICLE

(75) Inventors: Shinji Takeuchi, Okazaki (JP); Jiro Nakano, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 120 days.

(21) Appl. No.: 11/794,252

(22) PCT Filed: May 16, 2006

(86) PCT No.: PCT/JP2006/309714

§ 371 (c)(1),
(2), (4) Date: Jun. 27, 2007

(87) PCT Pub. No.: WO2006/123640

PCT Pub. Date: Nov. 23, 2006

(65) Prior Publication Data

US 2007/0289804 A1    Dec. 20, 2007

(30) Foreign Application Priority Data

May 17, 2005    (JP) .............................. 2005-143894

(51) Int. Cl.
*B62D 11/02*    (2006.01)

(52) U.S. Cl. ...................................... 180/6.62; 180/6.2

(58) Field of Classification Search ................ 180/402, 180/410–416, 6.2, 404, 197, 6.44, 6.48, 6.5, 180/6.62, 7.1; 303/146, 142, 9.63, 140, 188, 303/189; 192/12 R, 13 R; 701/41, 48

See application file for complete search history.

(56) References Cited

U.S. PATENT DOCUMENTS

| | | | | |
|---|---|---|---|---|
| 1,348,558 | A | * | 8/1920 | Garner et al. ................ 180/6.7 |
| 4,124,084 | A | | 11/1978 | Albright et al. |
| 4,702,358 | A | * | 10/1987 | Mueller et al. ............ 192/13 R |
| 5,307,888 | A | | 5/1994 | Urvoy |
| 6,493,624 | B2 | * | 12/2002 | Nishida et al. ................ 701/89 |
| 6,543,859 | B2 | * | 4/2003 | Sakamoto ................ 303/113.2 |
| 2002/0060103 | A1 | | 5/2002 | Ritz et al. |
| 2003/0167116 | A1 | | 9/2003 | Erban |
| 2004/0176899 | A1 | | 9/2004 | Hallowell |

FOREIGN PATENT DOCUMENTS

| | | |
|---|---|---|
| EP | 0 999 117 | 5/2000 |
| EP | 1 207 090 | 5/2002 |
| JP | 50 15310 | 5/1975 |
| JP | 10 203334 | 8/1998 |
| JP | 2835173 | 10/1998 |
| JP | 2002 145098 | 5/2002 |
| JP | 3380315 | 12/2002 |
| JP | 2003 200840 | 7/2003 |

* cited by examiner

*Primary Examiner*—Lesley D Morris
*Assistant Examiner*—Levon Fiore
(74) *Attorney, Agent, or Firm*—Oblon, Spivak, McClelland, Maier & Neustadt, L.L.P.

(57) ABSTRACT

A vehicle including a steer-by-wire type steering device controlling yaw moment of the vehicle in correspondence with an operation of a steering wheel mechanically separated from each of wheels. The wheels are configured such that a steered angle cannot be changed. The steering device has a power distribution device capable of changing a distribution rate of power applied to each of the wheels, and a braking force control device capable of separately controlling a braking force for each of the wheels. The steering device controls a yaw moment of the vehicle by separately controlling the power applied to each of the wheels and the braking force in each of the wheels.

4 Claims, 4 Drawing Sheets

STEERING DEVICE FOR VEHICLE

FIELD OF THE INVENTION

The present invention relates to a steer-by-wire type steering device for a vehicle.

BACKGROUND OF THE INVENTION

In recent years, there has been proposed a steer-by-wire type steering device for a vehicle provided with a steering wheel (handle) mechanically separated from each of wheel of the vehicle. The steering device executes control of the yaw moment of the vehicle, that is, a steering operation in correspondence with an operation applied to the steering wheel.

In the steer-by-wire type steering device for a vehicle, an electric control system plays an essential and important role in the steering function for the vehicle. Accordingly, the required level of reliability for the steering device is higher than a steering device for vehicle in which the steering wheel is not mechanically separated from each of the wheels. Therefore, in the steer-by-wire type steering device mentioned above, various measures have been conventionally taken for responding to the required improvement in the reliability of the steering device, for example, an electronic control system that is multiplexed (for example, refer to Japanese Laid-Open Patent Publication No. 2003-200840), an emergency mechanical transmission mechanism is provided (for example, refer to Japanese Laid-Open Patent Publication No. 2002-145098), or the like.

However, in the case where the electronic control system is multiplexed, the system is complicated, and manufacturing costs thereof become extremely high. Further, in the case where the steering device for vehicle is provided with an emergency mechanical transmission mechanism, an advantage of the steer-by-wire such as a high design freedom resulting from a structure in which the wheel and the steering wheel are mechanically separated, is largely inhibited. Accordingly, an adverse effect is caused in either case.

SUMMARY OF THE INVENTION

The present invention is provided for solving the problems mentioned above, and an objective of the present invention is to provide a steer-by-wire type steering device for a vehicle that achieves high reliability by a simple structure.

In order to solve the problems mentioned above, in accordance with an aspect of the present invention, there is provided a steering device for a vehicle provided with a plurality of wheels, a steering wheel, a power distribution device, and a braking force control device. A plurality of wheels are provided in such a manner that a steered angle cannot be changed. The steering wheel is mechanically separated from each of the wheels. The power distribution device is capable of changing distribution rate of the power applied to the wheels. The braking force control device is capable of separately controlling braking force in each of the wheels. The steering device controls the yaw moment of the vehicle by changing the distribution rate of the power applied to each of the wheels and the braking force of each of the wheels in correspondence with an operation of the steering wheel.

It is preferable that wheels opposing one another across the longitudinal center line of the vehicle form pairs, and the steering device be provided with abnormality detecting means capable of detecting the occurrence of an abnormality in the power distribution device and the braking force control device per wheel. Further, in the case that the occurrence of an abnormality is detected, it is preferable to stop the control in which the abnormality is detected in the power distribution control or the braking force control, with respect to the wheel in which the abnormality has been generated and the wheel forming the pair therewith.

DESCRIPTION OF THE PREFERRRED EMBODIMENTS

A steering device for a vehicle with four-wheel drive according to one embodiment of the present invention will be described with reference to the accompanying drawings.

Figure 1:
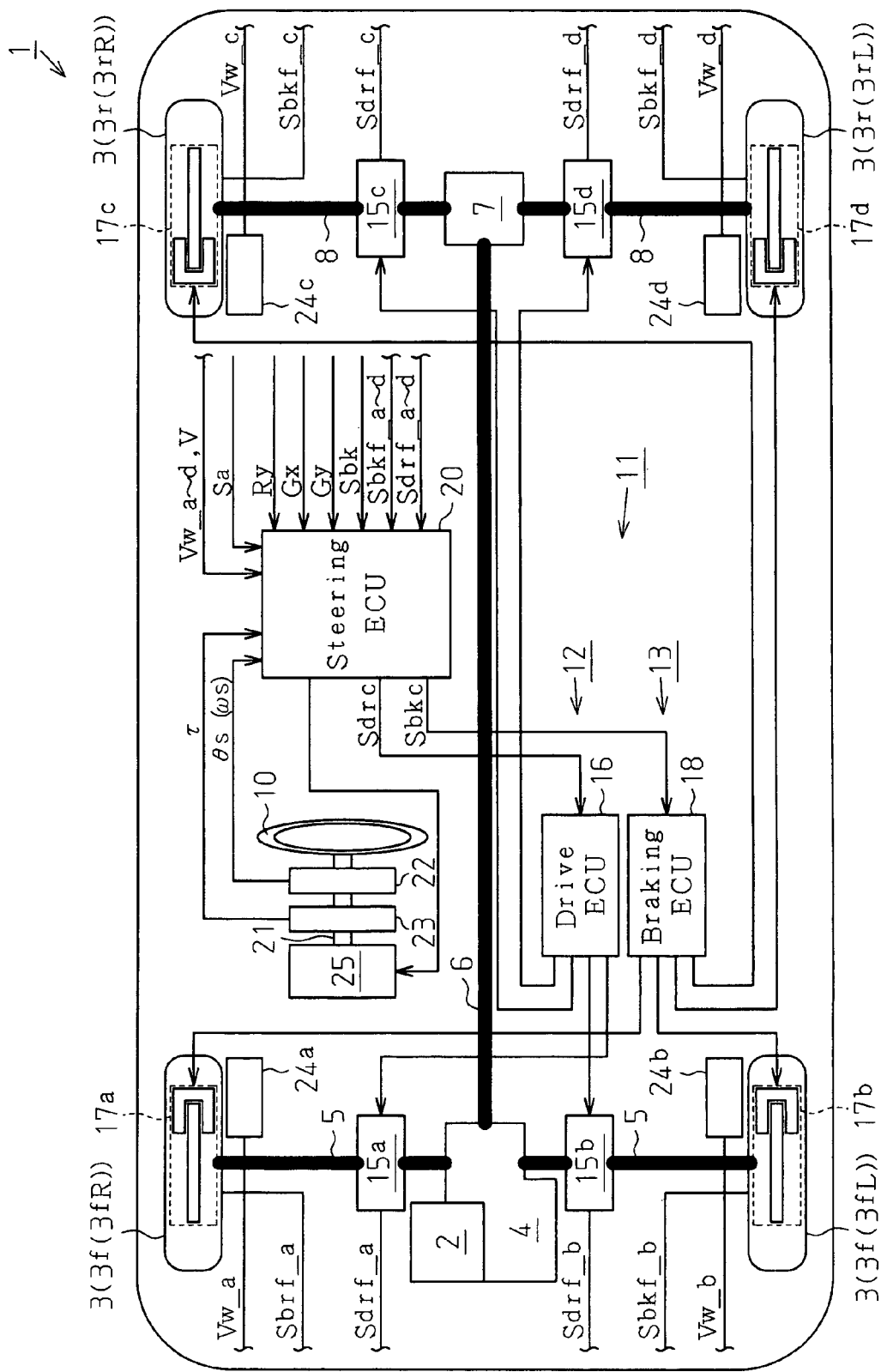
FIG. 1 is a diagrammatic view of a vehicle provided with a steering device for vehicle.

As shown in FIG. 1, a vehicle 1 is a four-wheel drive vehicle in which power from an engine 2 can be transmitted to the front wheels 3f (3fR and 3fL) and rear wheels 3r (3rR and 3rL) of the vehicle 1. A pair of front axles 5 and a propeller shaft 6 are coupled to a transaxle 4 assembled in one side of the engine 2. The propeller shaft 6 is coupled to a rear differential 7. A pair of rear axles 8 are coupled to the rear differential 7. Further, power of the engine 2 is transmitted to the front wheels 3f (3fR and 3fL) via the respective front axles 5 coupled thereto, and is transmitted to the rear wheels 3r (3rR and 3mL) coupled to the respective rear axles 8 via the propeller shaft 6 and the respective rear axles 8. The respective front wheels 3f (3fR and 3fL) are provided in such a manner as to form a pair across the longitudinal center line the vehicle 1. In the same manner, the respective rear wheels 3r (3rR and 3mL) are provided in such a manner as to form a pair across the longitudinal center line of the vehicle 1.

The vehicle 1 is provided with a steer-by-wire type steering device 11 for a vehicle that controls the yaw moment of the vehicle 1 in correspondence with operation of the steering wheel 10 which is mechanically separated from each of the wheels 3.

Each of the wheels 3 in accordance with the present invention is provided in such a manner that a steered angle cannot be changed. Further, the steering device 11 controls the yaw moment of the vehicle 1 by separately controlling the power distributed from the engine 2 so as to be transmitted to each of the wheels 3, and separately controlling the braking force in each of the wheels 3, without changing the steered angle of each of the wheels 3 in correspondence to the operation of the steering wheel 10.

Figure 2:
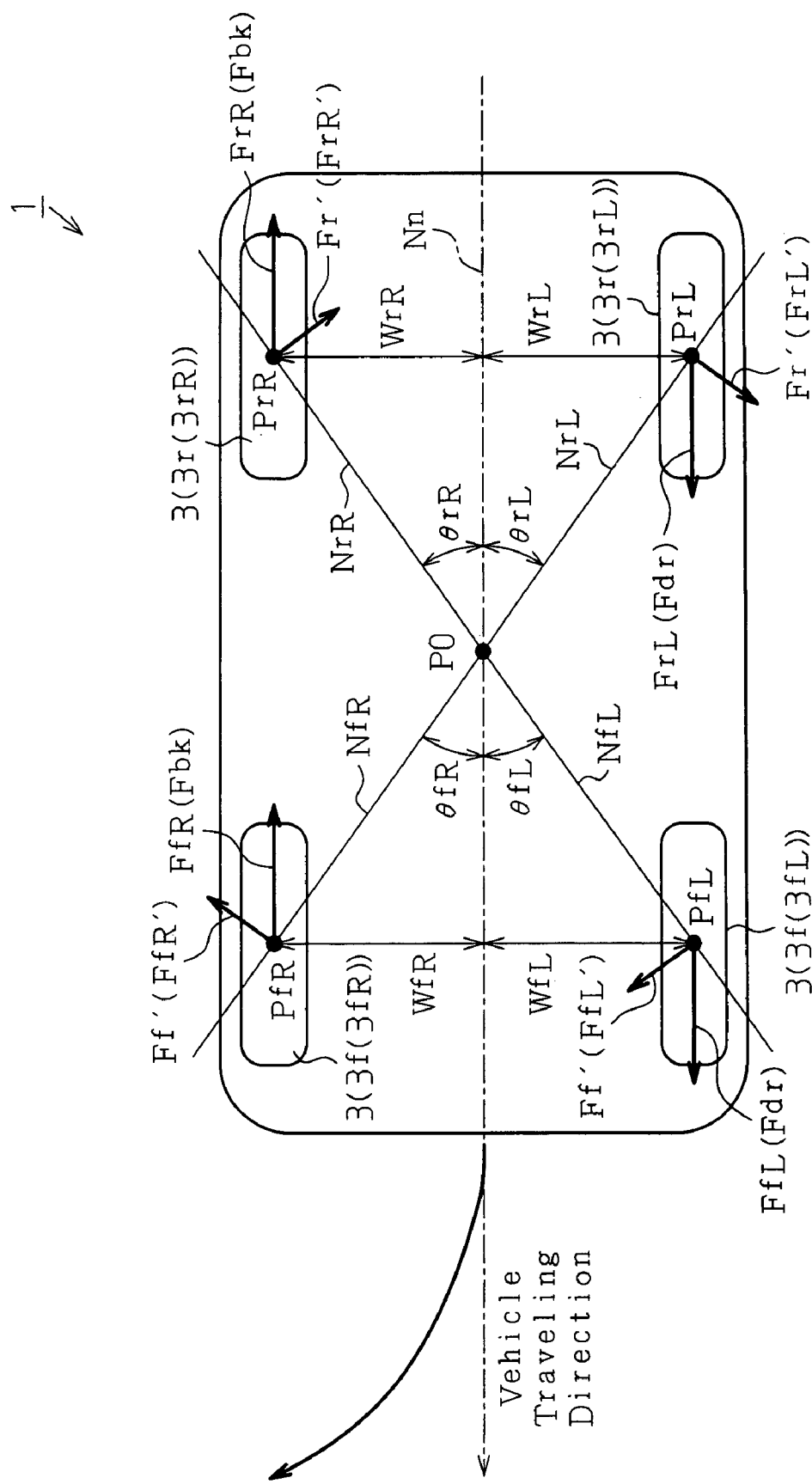
FIG. 2 is a diagrammatic view explaining a principle of a control of a vehicle yaw moment on the basis of a power distribution control and a braking force control.

Describing in detail, as shown in FIG. 2, power Fdr is transmitted to the one front wheel 3f, the power Fdr being larger than a power Fdr transmitted to the other front wheel 3f, in the front wheels 3f of the vehicle 1, whereby a force Ff is applied to the one front wheel 3f, the force Ff acting to turn the vehicle 1 to a direction of the other front wheel 3f (a left direction in the case of the right front wheel 3fR, and a right direction in the case of the left front wheel 3fL) with respect to a traveling direction of the vehicle 1. Further, power Fdr is transmitted to the one rear wheel 3r, the power Fdr being larger than a power Fdr transmitted to the other rear wheel 3r, in the rear wheels 3r, whereby a force Fr' is applied to the one rear wheel 3r, the force Fr' acting to turn the vehicle 1 in the direction of the other rear wheel 3r (the left direction in the case of the right rear wheel 3rR, and the right direction in the case of the left rear wheel 3rL) with respect to the traveling direction of the vehicle 1.

On the other hand, a braking force Fbk is applied to the one front wheel 3f, the braking force Fbk being larger than a braking force Fbk applied to the other front wheel 3f, in the front wheels 3f, whereby a force Ff' is applied to the one front wheel 3f, the force Ff' acting to turn the vehicle 1 to a direction of the one front wheel 3f (a right direction in the case of the right front wheel 3fR, and a left direction in the case of the left front wheel 3fL) with respect to the traveling direction of the vehicle 1. Further, a braking force Fbk is applied to the one rear wheel 3r, the braking force Fbk being larger than a braking force Fbk applied to the other rear wheel 3r, in the rear wheels 3r, whereby a force Fr' is applied to the one rear wheel 3r, the force Fr' acting to turn the vehicle 1 to a direction of the one rear wheel 3r (a right direction in the case of the right rear wheel 3rR, and a left direction in the case of the left rear wheel 3rL) with respect to the traveling direction of the vehicle 1.

In other words, when a line connecting the point of application of the force (the center of the ground contact area) PfL of the left front wheel 3fL and the center of gravity P0 of the vehicle 1 is denoted as a line NfL, and an angle between a line Nn that passes through the center of gravity P0 and extends in the longitudinal direction of the vehicle and the line NfL is denoted as θfL, the vehicle turning component FfL' of the driving and braking force (the power or the braking force) FfL applied to the left front wheel 3fL is expressed by the following expression (1).

$$FfL'=FfL\times\sin(\theta fL) \quad (1)$$

When the tread of the left front wheel 3fL is denoted as WfL, the yaw moment MfL around the center of gravity P0 generated by the vehicle turning component FfL' is expressed by the following expression (2).

$$MfL=(WfL/\sin(\theta fL))\times(FfL\times\sin(\theta fL))=WfL\times FfL \quad (2)$$

In the same manner, with regard to each of the other wheels 3 (3fR, 3rL and 3rR), when lines connecting points of force application PfR, PrL and PrR of the wheels 3 (3fR, 3rL and 3rR) and the center of gravity P0 are denoted as lines NfR, NrL and NrR, respectively, and angles between the line Nn extending in the longitudinal direction of the vehicle and the line NfR, NrL and NrR are denoted as θfR, θrL and θrR, respectively, vehicle turning components FfR', FrL' and FrR' of the driving and braking forces FfR, FrL and FrR thereof are expressed by the following expressions (3) to (5).

$$FfR'=FfR\times\sin(\theta fR) \quad (3)$$

$$FrL'=FrL\times\sin(\theta rL) \quad (4)$$

$$FrR'=FrR\times\sin(\theta rR) \quad (5)$$

When the treads of the respective wheels 3 (3fR, 3rL and 3rR) are denoted as WfR, WrL and WrR, yaw moments MfR, MrL and MrR around the center of gravity P0 generated by the vehicle turning components FfR', FrL' and FrR' are expressed by the following expressions (6) to (8).

$$MfR=WfR\times FfR \quad (6)$$

$$MrL=WrL\times FrL \quad (7)$$

$$MrR=WrR\times FrR \quad (8)$$

Further, a yaw moment M generated on the basis of the driving and braking forces FfL, FfR, FrL and FrR applied to the respective wheels 3 of the vehicle 1 is expressed by the following expression (9) from the expressions (2) and (6) to (8) mentioned above.

$$M=MfL+MfR+MrL+MrR \quad (9)$$

Accordingly, it is possible to generate a yaw moment largely turning the vehicle 1 to the right side in the traveling direction by applying the braking force Fbk to the right wheels 3 (the right front wheel 3fR and the right rear wheel 3rR) and transmitting the power Fdr to the left wheels 3 (the left front wheel 3fL and the left rear wheel 3rL), for example, as shown in FIG. 2. The steering device 11 controls the yaw moment of the vehicle 1 on the basis of the control of the power Fdr and the braking force Fbk for each wheel 3, that is, the control of the distribution of the power and the braking force for each wheel 3.

Describing in more detail, as shown in FIG. 1, the vehicle 1 in accordance with the present embodiment is provided with a power distribution device 12, and a braking force control device 13. The power distribution device 12 can change distribution rate of the power applied to each of the wheels 3. The braking force control device 13 can separately control the braking force in each of the wheels 3. Torque couplings 15a to 15d are provided in the respective front axles 5 and the rear axles 8 in accordance with the present embodiment. The respective torque couplings 15a to 15d can change the power transmitted to the wheels 3 corresponding to the respective torque couplings 15a to 15d, on the basis of a change of an engagement force of an electromagnetic clutch (not shown). Operation of each of the torque couplings 15a to 15d is controlled by a drive ECU 16. Hydraulic type brake devices 17a to 17d are provided in the respective wheels 3. The braking force generated from each of the brake devices 17a to 17d is separately controlled by a braking ECU 18. In the present embodiment, a hydraulic transmission system of each of the brake devices 17a to 17d is provided with an electromagnetic valve (not shown) capable of controlling a fluid flow rate supplied to each of the brake devices 17a to 17d. The braking ECU 18 separately controls the braking force generated from the brake devices 17a to 17d for each wheel 3 by controlling an operation of each of the electromagnetic valves.

In other words, in the present embodiment, the power distribution device 12 is structured by the respective torque couplings 15a to 15d and the drive ECU 16. Further, the braking force control device 13 is structured by the respective brake devices 17a to 17d and the braking ECU 18.

The steering device 11 for vehicle in accordance with the present embodiment is provided with a steering ECU 20. The steering ECU 20 computes a distribution rate of the power and the braking force for generating the yaw moment corresponding to the operation of the steering wheel 10. Further, the power distribution device 12 and the braking force control device 13 respectively execute a variable control of a distribution rate of the power applied to each of the wheels 3 (a distribution control of the power), and a variable control of the braking force in each of the wheels 3 (a control of the braking force), on the basis of a power control command Sdrc and a braking force control command Sbkc output from the steering ECU 20. In other words, the steering device 11 in accordance with the present embodiment is constituted by the steering wheel 10, the power distribution device 12, the braking force control device 13 and the steering ECU 20. The normal driving and braking functions are respectively controlled by the drive ECU 16 and the braking ECU 18. The respective ECUs execute the distribution control of the power and the control of the braking force, by superimposing a steering control component on the basis of the power control command Sdrc and the braking force control command Sbkc output from the steering ECU 20 over the driving and braking control component.

Describing in detail, a plurality of sensors are connected to the steering ECU 20 in accordance with the present embodiment, and the steering ECU 20 computes the distribution rate for the power and the braking force for generating the yaw moment corresponding to the operation of the steering wheel 10 on the basis of the various vehicle state quantities detected by the respective sensors. Specifically, a steering angle sensor 22 and a torque sensor 23 are provided in a steering shaft 21 to which the steering wheel 10 is coupled. The steering ECU 20 detects a steering angle θs and a steering speed ωs of the steering wheel 10, and a steering torque τ input to the steering wheel 10, on the basis of outputs signals of the steering angle sensor 22 and the torque sensor 23. Wheel speed sensors 24a to 24d are provided respectively in the wheels 3. The steering ECU 20 detects wheel speeds Vw_a to Vw_d and a vehicle speed V on the basis of output signals of the respective wheel speed sensors 24a to 24d. Further, the vehicle 1 is provided with an accelerator pedal position degree sensor, a brake sensor, a yaw rate sensor and an acceleration sensor which are not illustrated. An accelerator pedal position signal Sa, a brake signal Sbk, a yaw rate Ry, a lateral acceleration (a lateral G) Gx and a longitudinal acceleration (a longitudinal G) Gy detected by these sensors are input to the steering ECU 20. Further, the steering ECU 20 computes the distribution rate of the power and the braking force for generating the yaw moment corresponding to the operation of the steering wheel 10, on the basis of the various vehicle state quantities detected as mentioned above.

Specifically, the steering ECU 20 computes a target yaw rate in accordance with a vehicle model computation on the basis of the steering angle θs and the vehicle speed V. Further, the steering ECU 20 computes the distribution rate of the power and the braking force for generating the computed target yaw rate, on the basis of the various vehicle state quantities mentioned above. Next, the steering ECU 20 outputs the power control command Sdrc to the drive ECU 16 and the braking force control command Sbkc to the braking ECU 18, for achieving the distribution rate of the power and the braking force which are computed. Subsequently, the power distribution device 12 and the braking force control device 13 are activated on the basis of the power control command Sdrc and the braking force control command Sbkc, and the distribution rate of the power and the braking force are changed, whereby the yaw moment of the vehicle 1 is controlled.

A steering shaft 21 in accordance with the present embodiment is provided with a reaction force actuator 25 for applying a steering reaction force to the steering wheel 10. An operation of the reaction force actuator 25 is controlled by the steering ECU 20. Further, the steering ECU 20 controls the operation of the reaction force actuator 25 (controls the steering reaction force) for applying an optimum steering reaction force in correspondence to the vehicle state to the steering wheel 10 in conjunction with the outputs of the power control command Sdrc and the braking force control command Sbkc. The steering ECU 20 in accordance with the present embodiment computes the steering reaction force mentioned above on the basis of the steering torque τ, the steering angle θs, the vehicle speed V and the estimated road surface reaction force. Further, the steering ECU 20 controls the operation of the reaction force actuator 25 through a supply of driving power to a motor (not shown) which is a drive source of the reaction force actuator 25.

Figure 3:
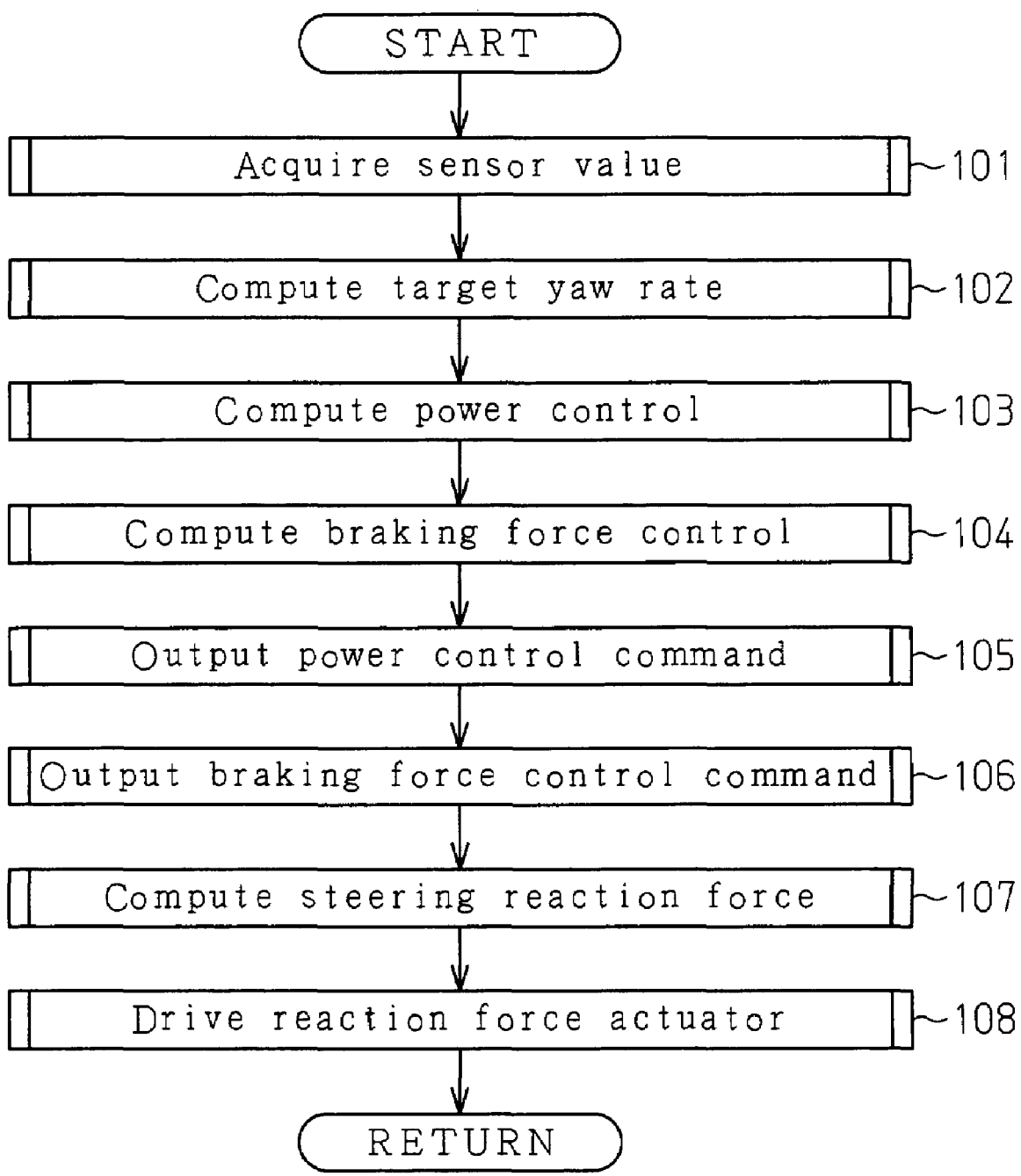
FIG. 3 is a flowchart showing a procedure of the control of the yaw moment and a control of a steering reaction force by a steering ECU.

In other words, as shown in a flowchart in FIG. 3, when the steering ECU 20 acquires the various vehicle state quantities as the sensor value (step 101), it first calculates the target yaw rate on the basis of the vehicle model (step 102). Consequently, the steering ECU 20 computes the distribution rate of the power for generating the computed target yaw rate (a power control computation, step 103), and computes the braking force (a braking force control computation, step 104). Further, the steering ECU 20 outputs the power control command Sdrc to the drive ECU 16 (step 105), and outputs the braking force control command Sbkc to the braking ECU 18 (step 106). Next, the steering ECU 20 computes the steering reaction force applied to the steering wheel 10 (step 107). Further, the steering ECU 20 controls the operation of the reaction force actuator for generating the computed steering reaction force (a reaction force actuator drive, step 108).

Fail-Safe Control

Next, a description will be given of a fail-safe control in the steering device for vehicle in accordance with the present embodiment.

As mentioned above, the steering device 11 for vehicle in accordance with the present embodiment controls the yaw moment of the vehicle 1 by controlling the power transmitted to each of the wheels 3 and the braking force in each of the wheels 3. Accordingly, even in the case where an abnormality has occurred in the power distribution device 12 or the braking force control device 13 constituting the steering device 11, and the distribution of the power or the braking force cannot be controlled in any of the wheels 3, it is possible to control the yaw moment of the vehicle 1, that is, change the traveling direction of the vehicle 1 in accordance with the control of the distribution of the power and the control of the braking force in the other wheels 3 than the wheel 3 in which an abnormality has occurred. Further, even in the case where one of the power distribution device 12 and the braking force control device 13 is completely stopped, it is possible to change the traveling direction of the vehicle in accordance with the other control (the control of the braking force in the case where the power distribution device 12 is stopped, and the control of the distribution of the power in the case where the braking force control device 13 is stopped).

In other words, in the steering device 11 in accordance with the present embodiment, multiplexing of an electronic control system is realized by controlling the power transmitted to each of the wheels 3 of the vehicle 1, and the braking force in each of the wheels 3, or high reliability is achieved without an emergency mechanical transmission mechanism. Further, since the steered angle of each of the wheels 3 cannot be changed, it is possible to secure straight traveling state for the vehicle 1 at the very least even in the case that both of the power distribution device 12 and the braking force control device 13 are completely stopped.

However, for example, in the case that an abnormality has occurred in any one of the torque couplings 15a and 15b corresponding to the front wheel 3f (the right front wheel 3fR or the left front wheel 3fL), if only the distribution control of the power in the side, in which an abnormality has occurred, is stopped, a difference is generated between reactions at a time of turning to the left and at a time of turning to the right, and there is a possibility that a feeling of insecurity of a driver increased.

In keeping with this point, in the steering device 11 in accordance with the present embodiment, in the case that the abnormality of the power distribution device 12 or the braking force control device 13 is detected in any one of the wheels 3, the control in which the abnormality is detected, in the control of the distribution of the power and the control of the braking force is stopped in the wheel 3 forming a pair with the wheel 3 in which the generation of the abnormality is detected, in addition to the wheel 3 in which an abnormality has occurred (the left front wheel 3fL in the case of the right front wheel 3fR). Accordingly, even when an abnormality has occurred, it is possible to suppress the difference of the reaction between the time of turning to the right and the time of turning to the left.

Describing in detail, as shown in FIG. 1, the steering ECU 20 in accordance with the present embodiment can detect the abnormalities of the power distribution device 12 and the braking force control device 13 respectively for each of the wheels 3, on the basis of driving abnormality signals Sdrf_a to Sdrf_d output from the respective torque couplings 15a to 15d, and braking abnormality signals Sbkf_a to Sbkf_d output from the respective brake devices 17a to 17d. In other words, in accordance with the present embodiment, the abnormality detecting means is constituted by the steering ECU 20. Further, the control in which the abnormality is detected, in the control of the distribution of the power and the control of the braking force is stopped with respect to both the front wheels 3f in the case that the wheel 3 in which the abnormality occurs is any one of the front wheels 3f, and with respect to both the rear wheels 3r in the case that the wheel 3 in which the abnormality is generated is any one of the rear wheels 3r.

Figure 4:
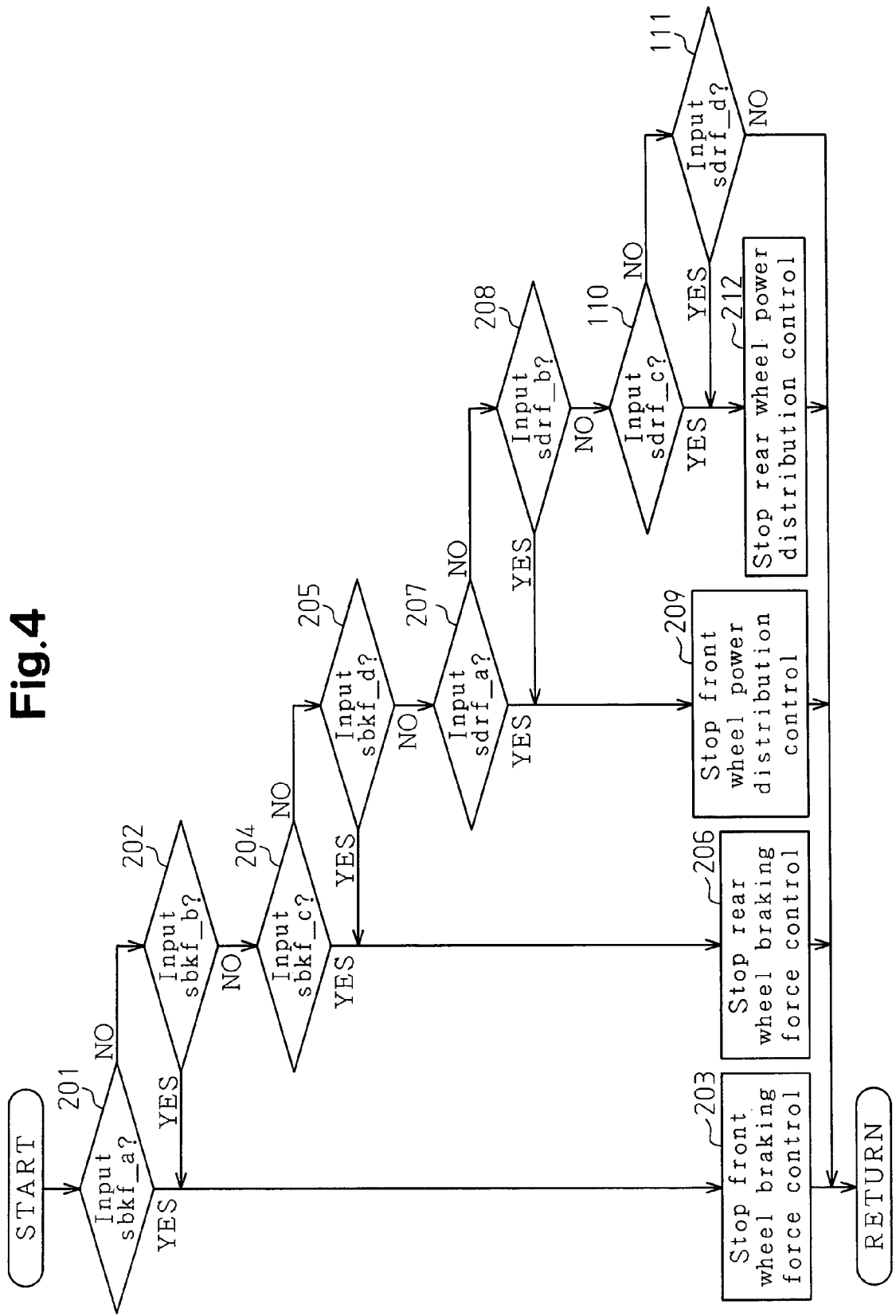
FIG. 4 is a flowchart showing a process of a fail-safe control by the steering ECU.

Specifically, as shown in a flowchart in FIG. 4, the steering ECU 20 first determines whether or not the braking abnormality signal Sbkf_a indicating that the abnormality of the braking force control device 13 is generated in the right front wheel 3fR is input (step 201). In the case that it is determined that the braking abnormality signal Sbkf_a is not input (NO in step 201), the steering ECU 20 subsequently determines whether or not the braking abnormality signal Sbkf_b indicating that the abnormality of the braking force control device 13 is generated in the left front wheel 3fL is input (step 202). Further, in the case that it is determined in step 201 that the braking abnormality signal Sbkf_a is input (YES in step 201), or it is determined in step 202 that the braking abnormality signal Sbkf_b is input (YES in step 202), the steering ECU 20 stops the control of the braking force with respect to the front wheels 3f (step 203).

On the other hand, in the case that it is determined in step 202 that the braking abnormality signal Sbkf_b is not input (NO in step 202), the steering ECU 20 determines whether or not the braking abnormality signal Sbkf_c indicating that the abnormality of the braking force control device 13 is generated in the right rear wheel 3rR is input (step 204). In the case that it is determined that the braking abnormality signal Sbkf_c is not input (NO in step 204), the steering ECU 20 subsequently determines whether or not the braking abnormality signal Sbkf_d indicating that the abnormality of the braking force control device 13 is generated in the left rear wheel 3rL is input (step 205). Further, in the case that it is determined in step 204 that the braking abnormality signal Sbkf_c is input (YES in step 204), or it is determined in step 205 that the braking abnormality signal Sbkf_d is input (YES in step 205), the steering ECU 20 stops the control of the braking force with respect to the rear wheels 3r (step 206).

Next, in the case that it is determined in step 205 that the braking abnormality signal Sbkf_d is not input (NO in step 205), the steering ECU 20 determines whether or not the driving abnormality signal Sdrf_a indicating that an abnormality of the power distribution device 12 has occurred in the right front wheel 3fR is input (step 207). In the case that it is determined that the driving abnormality signal Sdrf_a is not input (NO in step 207), the steering ECU 20 subsequently determines whether or not the driving abnormality signal Sdrf_b indicating that an abnormality of the power distribution device 12 has occurred in the left front wheel 3fL is input (step 208). Further, in the case that it is determined in step 207 that the driving abnormality signal Sdrf_a is input (YES in step 207), or it is determined in step 208 that the driving abnormality signal Sdrf_b is input (YES in step 208), the steering ECU 20 stops the control of the distribution of the power with respect to the front wheels 3f (step 209).

On the other hand, in the case that it is determined in step 208 that the driving abnormality signal Sdrf_b is not input (NO in step 208), the steering ECU 20 determines whether or not the driving abnormality signal Sdrf_c indicating that an abnormality of the power distribution device 12 has occurred in the right rear wheel 3rR is input (step 210). In the case that it is determined that the driving abnormality signal Sdrf_c is not input (NO in step 210), the steering ECU 20 subsequently determines whether or not the driving abnormality signal Sdrf_d indicating that an abnormality of the power distribution device 12 has occurred in the left rear wheel 3rL is input (step 211). Further, in the case that it is determined in step 210 that the driving abnormality signal Sdrf_c is input (YES in step 210), or it is determined in step 211 that the driving abnormality signal Sdrf_d is input (YES in step 211), the steering ECU 20 stops the control of the distribution of the power with respect to the rear wheels 3r (step 212). In the case that it is determined in step 211 that the driving abnormality signal Sdrf_d is not input (NO in step 211), the steering ECU 20 does not stop the control of the braking force and the control of the distribution of the power.

As mentioned above, in accordance with the present embodiment, it is possible to obtain the following features.

(1) The vehicle 1 is provided with a steer-by-wire type steering device 11 for a vehicle controlling the yaw moment of the vehicle 1 in correspondence with the operation of the steering wheel 10 mechanically separated from each of the wheels 3. The steered angle of each of the wheels 3 cannot be changed. The steering device 11 has the power distribution device 12 capable of separately changing the distribution rate of the power applied to each of the wheels 3, and the braking force control device 13 capable of controlling the braking force in each of the wheels 3. Further, the steering device 11 controls the yaw moment of the vehicle 1 by separately controlling the power transmitted to each of the wheels 3 and the braking force in each of the wheels 3.

In accordance with the structure mentioned above, even in the case where any abnormality has occurred in the power distribution device 12 or the braking force control device 13 constituting the steering device 11 for vehicle, and the control of the distribution of the power or the control of the braking force cannot be executed in any of the wheels 3, it is possible to control the yaw moment of the vehicle 1, that is, change the traveling direction of the vehicle 1, on the basis of the control of the distribution of the power and the control of the braking force in the other wheels 3 than the wheel 3 in which an abnormality has occurred. Further, even in the case that the any of the power distribution device 12 and the braking force control device 13 is completely stopped, it is possible to change the traveling direction of the vehicle 1 on the basis of the other control (the control of the braking force in the case that the power distribution device 12 is stopped, and the control of the distribution of the power in the case that the braking force control device 13 is stopped).

In other words, since the power transmitted to each of the wheels 3 of the vehicle 1, and the braking force in each of the wheels 3 are separately controlled, it is possible to achieve high reliability on the basis of a simple structure without causing a complication and a cost increase of the system due to the multiplexing of the electronic control system, and a reduction of a design freedom due to the provision of the emergency mechanical transmission mechanism. Further, even in the case that both of the power distribution device 12 and the braking force control device 13 are completely stopped, because the steered angle of each of the wheels 3 is not changed, it is possible to secure a straight traveling state for the vehicle 1 at the very least. In addition, since a steering mechanism for changing the steered angle of the wheel 3 such as a rack shaft or the like is not required, it is possible to further increase the advantages of steer-by-wire.

(2) The steering device 11 for a vehicle has the function for detecting abnormalities in the power distribution device 12 and the braking force control device 13 respectively for each of the wheels 3. Further, in the case where abnormalities of the power distribution device 12 and the braking force control device 13 are detected in any of the wheels 3, the control in which the abnormality is detected in the control of the distribution of the power or the control of the braking force is stopped with respect to the wheel 3 (the left front wheel 3fL in the case of the right front wheel 3fR) forming a pair with the wheel 3 in which the abnormality has been detected, in addition to the wheel 3 in which the abnormality has been detected. In accordance with the structure mentioned above, it is possible to suppress the difference of the reaction at a time of turning to the right and the left, even at a time when an abnormality has occurred, whereby it is possible to reduce the feeling of insecurity.

The illustrated embodiment may be modified as follows.

The illustrated invention is embodied as a four-wheel drive vehicle in the present embodiment, however, it may be embodied as a vehicle having four or more wheels.

The steering device 11 in accordance with the illustrated embodiment has the steering ECU 20. The power distribution device 12 and the braking force control device 13 respectively execute the control of the distribution of the power and the control of the braking force on the basis of the power control command Sdrc and the braking force control command Sbkc output by the steering ECU 20. However, the structure is not limited to this, but the power distribution device 12 and the braking force control device 13 may respectively compute the distribution rate of the power and the braking force for generating the yaw moment in correspondence to the operation of the steering wheel 10, and execute the control of the distribution of the power and the control of the braking force. Further, one control apparatus may have the functions of the steering ECU 20, the drive ECU 16 and the braking ECU 18 in accordance with the present embodiment.

The power distribution device 12 in accordance with the present embodiment is constituted by the respective torque couplings 15a to 15d provided in each of the front axles 5 and each of the rear axles 8. The structure is not limited to this, but may be provided with, for example, a differential gear.

In the present embodiment, the power of the engine 2 is transmitted to each of the wheels 3, however, the drive source may be constituted by an electric motor. In an "in-wheel motor type vehicle" in which a drive motor is incorporated in each of the wheels, a control apparatus controlling the drive of each of the driving motors constitutes the power distribution device.

The invention claimed is:

1. A steering device for a vehicle comprising:
   a plurality of wheels provided on each side of a longitudinal center line of the vehicle, the wheels being independently controllable and provided in such a manner that a steered angle of all of the wheels is unchangeable;
   a steering wheel mechanically separated from said wheels;
   a power distribution device capable of separately and independently distributing power to all of said wheels, such that each of said wheels can receive power at a rate different from another wheel on the same side of the longitudinal center line of the vehicle;
   a braking force control device capable of separately and independently controlling braking force in each of said wheels; and
   a controller capable of controlling a yaw moment of the vehicle by separately and independently changing the distribution rate of the power applied to each of said wheels and the braking force of each of the wheels in correspondence to an operation of said steering wheel.

2. The steering device for vehicle according to claim 1, wherein said plurality of wheels are provided in such a manner that wheels opposing one another across the longitudinal center line of the vehicle form pairs, the steering device further comprises an abnormality detecting unit capable of detecting an abnormality in said power distribution device and the braking force control device for each of said wheels, and
   in the case that an abnormality is detected, the steering device stops the control in which said abnormality has been detected in said power distribution control and said braking force control, with respect to the wheel in which said abnormality has occurred and the wheel forming the pair therewith.

3. A steering device for a vehicle comprising:
   a plurality of wheels provided on each side of a longitudinal center line of the vehicle, the wheels being independently controllable and provided in such a manner that a steered angle of all of the wheels is unchangeable;
   a steering wheel mechanically separated from said wheels;
   power distribution means for separately and independently distributing power to all of said wheels, such that each of said wheels can receive power at a rate different from another wheel on the same side of the longitudinal center line of the vehicle;
   braking force control means for separately and independently controlling braking force in each of said wheels; and
   control means for controlling a yaw moment of the vehicle by separately and independently changing the distribution rate of the power applied to each of said wheels and the braking force of each of the wheels in correspondence to an operation of said steering wheel.

4. The steering device for vehicle according to claim 3, wherein said plurality of wheels are provided in such a manner that wheels opposing one another across the longitudinal center line of the vehicle form pairs, the steering device further comprises:
   abnormality detecting means for detecting an abnormality in said power distribution means and the braking force control means for each of said wheels; and
   abnormality control means operative when an abnormality has been detected in one of said wheels by said abnormality detecting means, for stopping said power distribution means and said braking force control means with respect to the wheel in which said abnormality has been detected and the wheel forming the pair therewith.

* * * * *